Sept. 5, 1933.  S. E. BOUCHARD  1,925,368
BRIDGE FOR GOGGLES
Original Filed Oct. 8, 1928
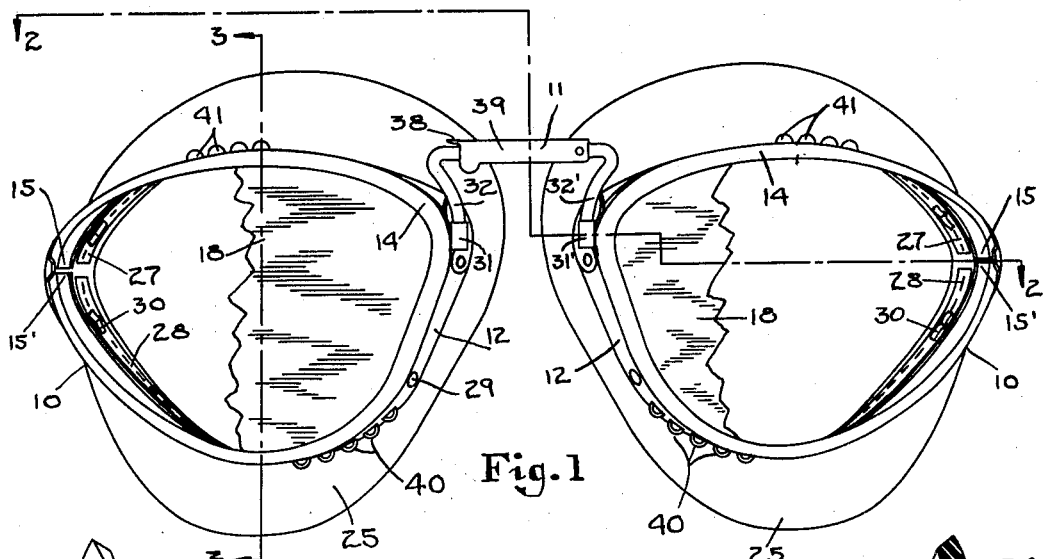
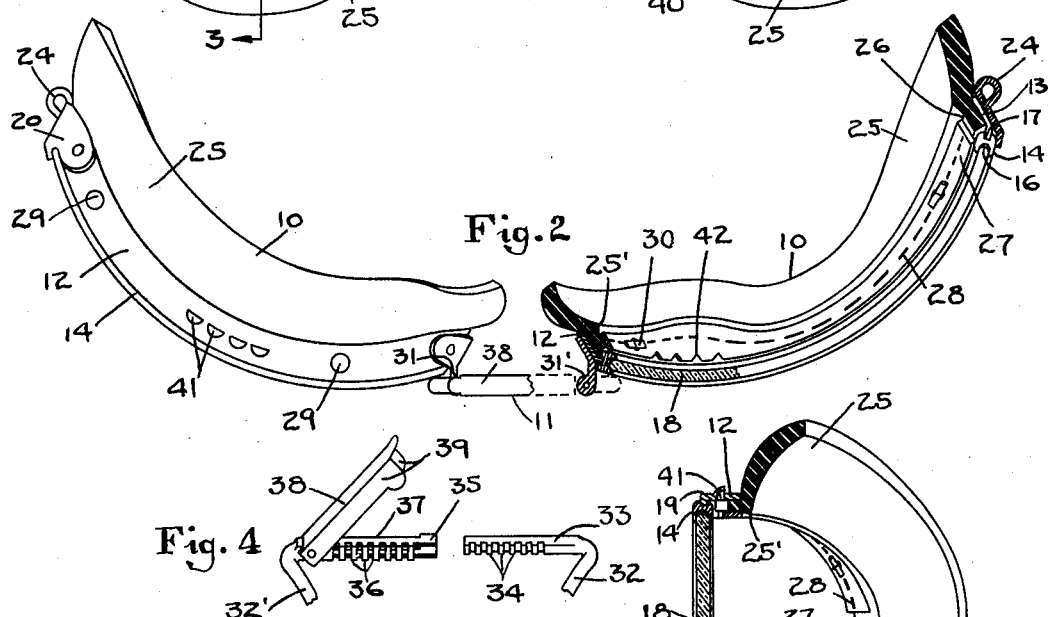
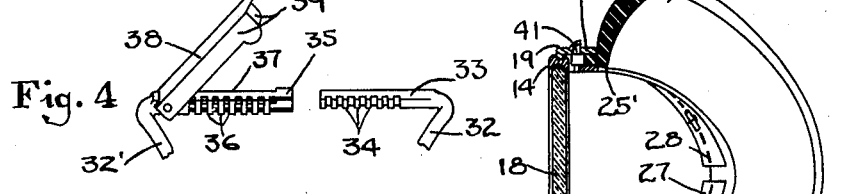
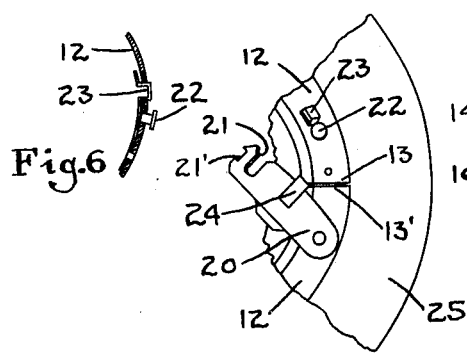
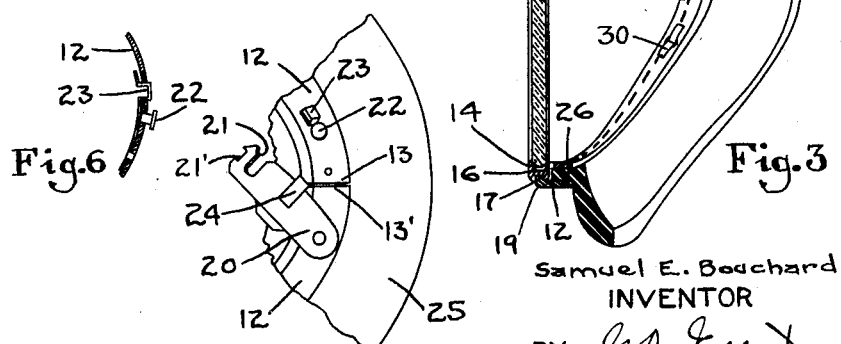
Samuel E. Bouchard
INVENTOR
BY *G. A. Ellestad*
ATTORNEY Patented Sept. 5, 1933

1,925,368

UNITED STATES PATENT OFFICE 1,925,368

BRIDGE FOR GOGGLES

Samuel E. Bouchard, Rochester, N. Y., assignor to Bausch & Lomb Optical Company, Rochester, N. Y., a corporation of New York Original application October 8, 1928, Serial No. 311,010. Divided and this application October 14, 1929. Serial No. 399,449

5 Claims. (Cl. 88—43)

This invention relates to goggles or eye protecting devices of a type which are especially adapted for use by aviators and motorists. One of the objects of this invention is to provide an improved pair of goggles which will be durable, simple of structure and readily adjustable to fit any wearer. Another object is to provide an improved bridge which may readily be adjusted for various interpupillary distances. Other objects and advantages reside in certain novel features of construction, arrangement and combination of parts which will hereinafter be more fully described and pointed out in the appended claims.

This application is a division of my co-pending application Serial No. 311,010, filed October 8, 1928.

Referring to the drawing:

Fig. 1 shows a front elevation of a pair of goggles embodying my invention.

Fig. 2 is a view partly in plan and partly in section taken on line 2—2 of Fig. 1.

Fig. 3 is a vertical sectional view taken on line 3—3 of Fig. 1.

Fig. 4 shows my improved bridge with the parts in separated relation.

Fig. 5 is a detail view showing the latching member.

Fig. 6 shows a detail, partly in section.

A preferred embodiment of my invention is illustrated in the drawing wherein there is shown a pair of goggles comprising two eye units or eye cups 10 which are pivotally connected by a bridge 11. The eye cup 10 comprises a frame member 12 which is preferably made by forming a strip of sheet material into an approximately oval shape so that the two free ends of the strip are brought adjacent to each other as shown at 13 and 13'. A lens holding rim 14 is also formed into an approximately oval shape with its two free ends 15 and 15' adjacent to each other. The lens holding rim is provided with an inner groove 16 and an outer groove 17 so that a cross section of the rim 14 is substantially H-shaped in appearance. The inner groove 16 receives a suitable lens 18 and the outer groove 17 receives the inwardly turned edge 19 of frame member 12.

A latch 20, having notches 21 and 21', is pivotally mounted on frame member 12 adjacent the end 13' as shown in Fig. 5. The notches 21 and 21' cooperate, respectively, with the post 22 and the spring member 23 to hold the latch securely in position. When the latch is thusly secured, the two ends 13 and 13' of the frame member 12 are held firmly together and a clamping action is thereby applied to the lens holding rim 14 to firmly hold the lens 18. To insert a lens in the eye unit 10, the latch 20 is first released to permit the ends of the split frame 12 and the lens holding rim 14 to be spread apart. The lens is seated in the groove 16 of the rim 14, the edge 19 of frame 12 is placed in the outer groove 17, the free ends are brought together and latch 20 is then closed. The latch 20 is provided with a loop or eyelet 24 to which may be attached an elastic headband or other suitable means for holding the pair of goggles on the face of the wearer.

The eye unit 10 is provided with a cushion member 25 which is preferably made of sponge rubber and molded or formed in one piece with an integral lip 26 surrounding the vision opening 25'. A reinforcing member 27 is secured to the inside of lip 26 by means of stitching 28. The cushion 25, together with the reinforcing member 27 which is stitched thereto, is secured to frame 12 by means of split tubular rivets 29 which pass through aligned openings in the frame 12 and in the lip 26 and reinforcing strip 27, the ends of the rivets being bent over as shown at 30. Extra cushions can be supplied with the reinforcing members already stitched thereto so that a cushion can be readily replaced by merely withdrawing and replacing the rivets 29.

Secured to the frames 12 are the bearing members 31 and 31' in which are pivotally mounted the posts 32 and 32' of the bridge 11. As shown in Fig. 4, the post 32 extends upwardly and thence horizontally, the horizontal portion 33 taking the form of a rectangular rod having a plurality of spaced teeth or notches 34 along one edge thereof. The post 32 also extends upwardly and horizontally, with the last named extension taking the form of a rectangular tube 35. The front side of the tube 35, as seen in Fig. 4, is provided with a plurality of spaced openings 36, which are formed by cutting away portions of the front wall of the tube. A portion of the rear wall of tube 35 is cut away, as shown at 37 in Fig. 4. A latch 38, having two depending side walls 39, is pivotally mounted on the upper portion of post 32' and serves to retain members 33 and 35 in adjusted position, as will hereinafter be described.

In assembling the members of the bridge 11, the rectangular notched rod 33 is angularly inserted in the open end of tube 35 with the end of rod 33 projecting through the opening 37 in the rear wall of tube 35. The rod 33 and tube 35 are then brought into alignment with the teeth or notches 34 in engagement with selected openings 36 in the front wall of tube 35 to provide the desired bridge width. The latch 38 is then closed to the position shown in Fig. 1 so that the downwardly depending walls 39 of the latch 38 securely hold the members 33 and 35 in the adjusted aligned position. The walls 39 are preferably bent inwardly a slight amount so as to frictionally engage the sides of the members 33 and 35 and so prevent accidental opening of the latch 38.

In goggles of this type, it is quite necessary that efficient ventilation be provided for the eye units in order to prevent the gathering of condensed moisture on the inside lens surfaces and also to afford comfort to the wearer. This is accomplished by providing air inlet openings 40 and outlet openings 41 at the bottom and top, respectively, of frame member 12. The reinforcing member 27 is cut away as shown at 42 in order that a free current of air will not be obstructed.

From the foregoing it will be apparent that I am able to attain the objects of my invention and provide an improved pair of goggles which can be readily manipulated. The bridge can be easily adjusted for different widths, the lenses may be removed or replaced without the use of tools and the cushions can be removed or replaced without bothering with laborious and inconvenient stitchings. Although any suitable material may be used in the construction of my improved goggles, the frame members and the lens holding rims are preferably made of aluminum on account of its lightness and durability. My improved bridge can obviously be used and adapted for use on spectacle frames and the like. Although I have shown and described a preferred embodiment of my invention, various modifications can obviously be made without departing from the spirit of the invention as pointed out in the appended claims.

I claim:

1. In an ophthalmic mounting, the combination of a bridge comprising a tubular member having a plurality of openings in one side thereof, a second member inserted in said tubular member, said second member having a plurality of teeth adapted to selectively cooperate with said openings to vary the width of the bridge, and latching means pivotally mounted on one of said members for holding said members in adjusted position.

2. A bridge for goggles comprising two members, each of said members having a portion provided with spaced notches along its edge, said members being positioned with their respective notched portions in selective engagement and latching means pivotally mounted on one of said members for holding said members in adjusted position.

3. A bridge for goggles and the like comprising a tubular member having a plurality of spaced notches in one side, a second member having a plurality of spaced teeth on its edge, said second member being positioned within said tubular member with said teeth selectively engaging said notches and pivotally mounted U-shaped latching means for holding said members in adjusted position.

4. A bridge for goggles and the like comprising a tubular member having a series of spaced openings in its wall, a second member positioned within said tubular member, said second member having a series of correspondingly spaced teeth selectively engaging said openings and means for holding said members in position, said means comprising a latch which is pivotally mounted on one of said members, said latch having depending flanges which extend along the sides of said members when the latch is closed.

5. A bridge for goggles and the like comprising a tubular member having an open end and a series of spaced openings on its front wall, a second member having a series of spaced teeth adapted to selectively engage said openings, said tubular member having a slot in its rear wall whereby said second member may be inserted through said open end and slot and moved to bring said teeth into engagement with said openings and means for releasably securing said members in adjusted position.

SAMUEL E. BOUCHARD.